United States Patent
Morrow

(10) Patent No.: US 8,311,559 B1
(45) Date of Patent: Nov. 13, 2012

(54) PASS THROUGH TOLL COLLECTION DEVICE FOR CELL PHONE ARCHITECTURE

(75) Inventor: Stephen Daniel Morrow, East Stroudsburg, PA (US)

(73) Assignee: Cellco Partnership, Basking Ridge, NJ (US)

( * ) Notice: Subject to any disclaimer, the term of this patent is extended or adjusted under 35 U.S.C. 154(b) by 32 days.

(21) Appl. No.: 12/853,933

(22) Filed: Aug. 10, 2010

(51) Int. Cl.
*H04W 88/02* (2009.01)

(52) U.S. Cl. .................................... 455/456.1

(58) Field of Classification Search ............. 455/63.1, 455/561, 456.1
See application file for complete search history.

(56) References Cited

U.S. PATENT DOCUMENTS

| 7,139,589 | B2 * | 11/2006 | Sawada ........................ 455/553.1 |
| 7,539,500 | B2 * | 5/2009 | Chiang ........................ 455/456.1 |
| 2007/0066226 | A1 * | 3/2007 | Cleveland et al. ............ 455/63.1 |
| 2007/0247333 | A1 * | 10/2007 | Borean et al. ............... 340/932.2 |
| 2008/0086240 | A1 * | 4/2008 | Breed ................................. 701/1 |
| 2010/0207754 | A1 * | 8/2010 | Shostak et al. ................ 340/450 |
| 2011/0039571 | A1 * | 2/2011 | Bodine et al. ............... 455/456.1 |

* cited by examiner

*Primary Examiner* — Diane Mizrahi

(57) ABSTRACT

A combination of a mobile station and electronic toll collection device includes a transponder configured to communicate with an automatic toll collection station. This provides an identification of the transponder for toll collection purposes. The mobile station antenna and a mobile transceiver are electrically linked and the mobile transceiver transmits and receives mobile communication signals via the antenna. Further, the transponder can use its own antenna or the mobile station antenna to communicate with the toll collection station. The mobile station includes a battery which is also electrically linked to the transponder to power both the transponder and the mobile station.

10 Claims, 3 Drawing Sheets

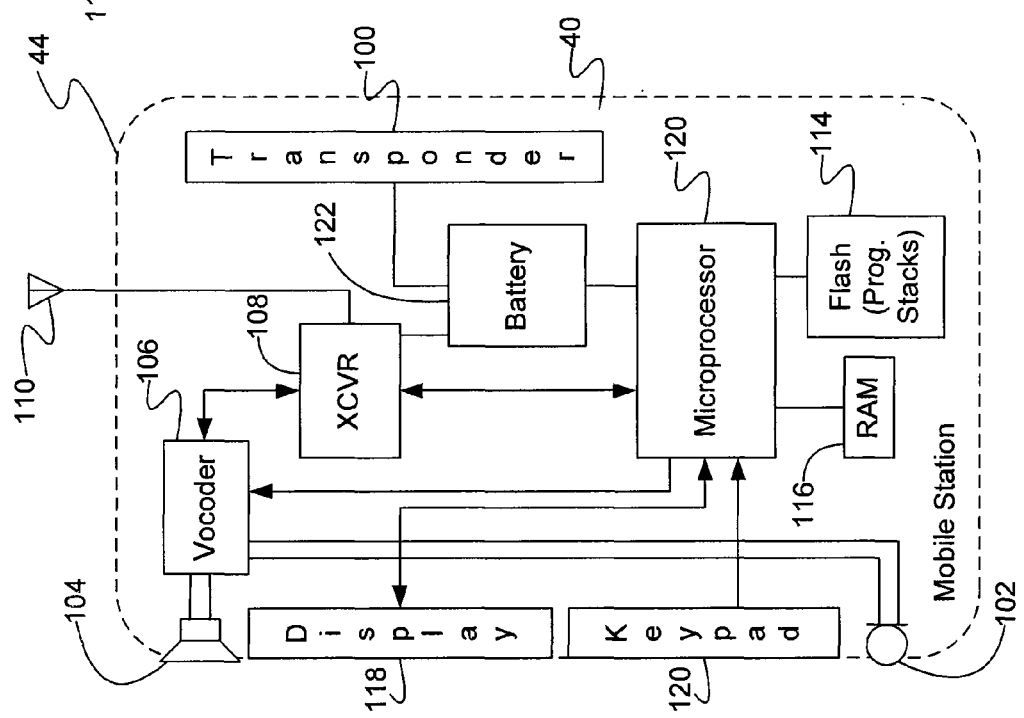
*FIG. 3*
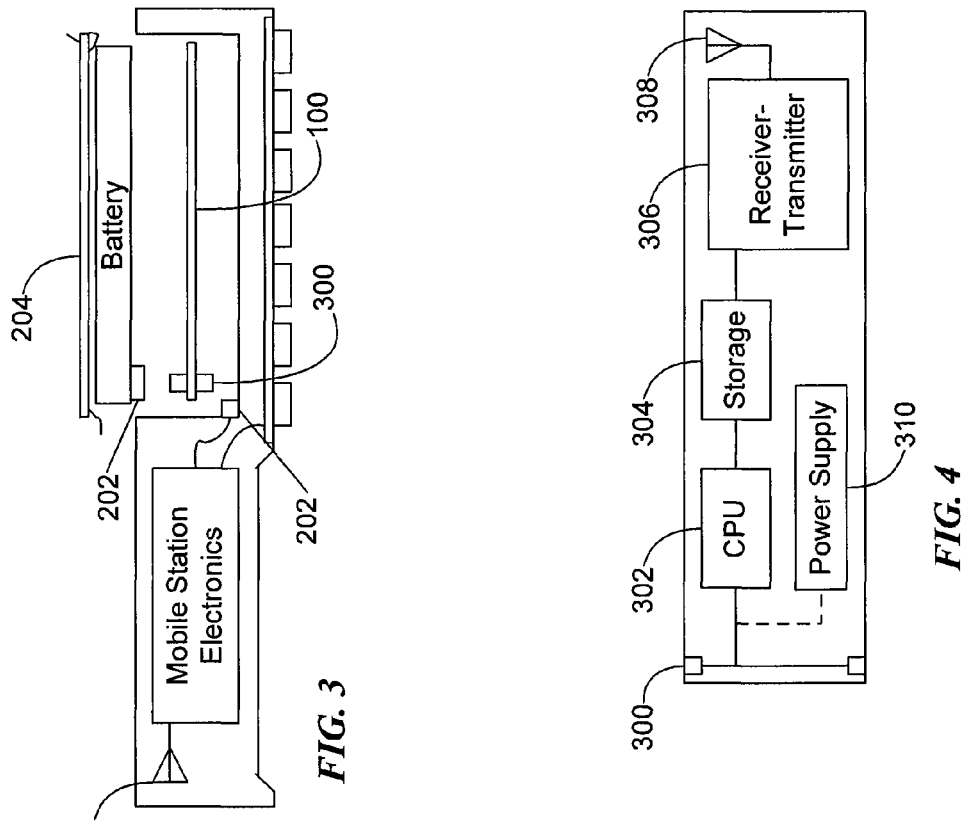
*FIG. 4*
*FIG. 2*

PASS THROUGH TOLL COLLECTION DEVICE FOR CELL PHONE ARCHITECTURE

TECHNICAL FIELD

The present subject matter relates to techniques and equipment to allow a cellular telephone to act as a toll collection transponder.

BACKGROUND

In recent years, more and more people are using their mobile stations as more than a communication device. For example, even most basic cellular telephones today now include cameras to take both still pictures and motion video and many are capable of playing audio and video files. Cellular telephones and other types of mobile stations are used to surf the internet, and maintain contacts, calendars, etc. Mobile stations have become an indispensable tool to a growing number of people and are typically always with the user wherever they travel. People are demanding more and more functionality out of their mobile stations to get the most out of a single device.

Additionally, more and more people own cars and drive longer and longer distances for both work and pleasure. To recover revenues, more and more municipalities and government agencies are placing tolls on the roads, bridges, and tunnels. However, as the number of cars traveling increases, traffic increases on the toll roads, and a traditional toll collection plaza becomes a bottle neck for traffic flow. To address this problem, the agencies have introduced various automatic electronic toll collection systems. These systems reduce the dependence on a manual attendant for the collection of tolls that the vehicle operator must present at toll collecting locations. For the system to function, individually coded electronic transponders must be supplied for mounting to the vehicle. One such system, known as the E-Z PASS is coded to provide an electronic signal unique to a particular vehicle. The vehicle owner obtains the transponder device from the appropriate authority and mounts it in the vehicle. A separate transponder device is needed in, and uniquely assigned to, each vehicle. However, implementation is expensive. Absent the one time construction cost, an ongoing cost to the agency is the need for supplying the hundreds of thousands of transponder units for the individual vehicles. Plus, as more and more drivers sign up for the program, the agency must keep up a constant supply of new transponders. One difficulty in supplying the toll collection transponder with the vehicle, is that each transponder must be registered with the particular agency and different agencies use different toll collection technologies.

Hence a need exists for a device that is already ubiquitous to take on the additional function as a toll collection transponder.

SUMMARY

The teachings herein alleviate one or more of the above noted problems and provide superior technology for automated toll collection by adding toll collection transponder functionality to a mobile station. A collection transponder may be added to a mobile station, e.g. as a retrofit to an existing design. In an alternative, integrated station implementation, elements of the mobile station such as its transceiver and control processor, implement the toll communications; and the station is provided with memory for storage of the requisite toll-related information.

The addition of toll collection transponder functionality to a user's mobile station provides one or more of the following advantages. First, it lowers the overhead costs to the electronic toll administration agency since the toll collection transponders will either be retrofitted to or incorporated in the mobile station. Second, the need for distribution centers can be reduced if the agency authorizes the mobile station distributors to distribute the retrofitted transponders or toll collection enabled mobile stations. The agency can then perform certain tasks over an Internet connection if the mobile station is connected to a computer, or the data on the transponder, including the pre-paid amount, can be "flashed" over the cellular network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 illustrates a diagram of a mobile station retrofitted with a toll collection transponder;

FIG. 3 is a cross-section of a cellular telephone type mobile station showing the placement of a retrofitted transponder;

FIG. 4 is a block diagram of an exemplary toll collection transponder; and

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various embodiments disclosed herein relate to the use of radio frequency identification tags or other transponder technologies for automatic toll collection in combination with a mobile station.

Figure 1:
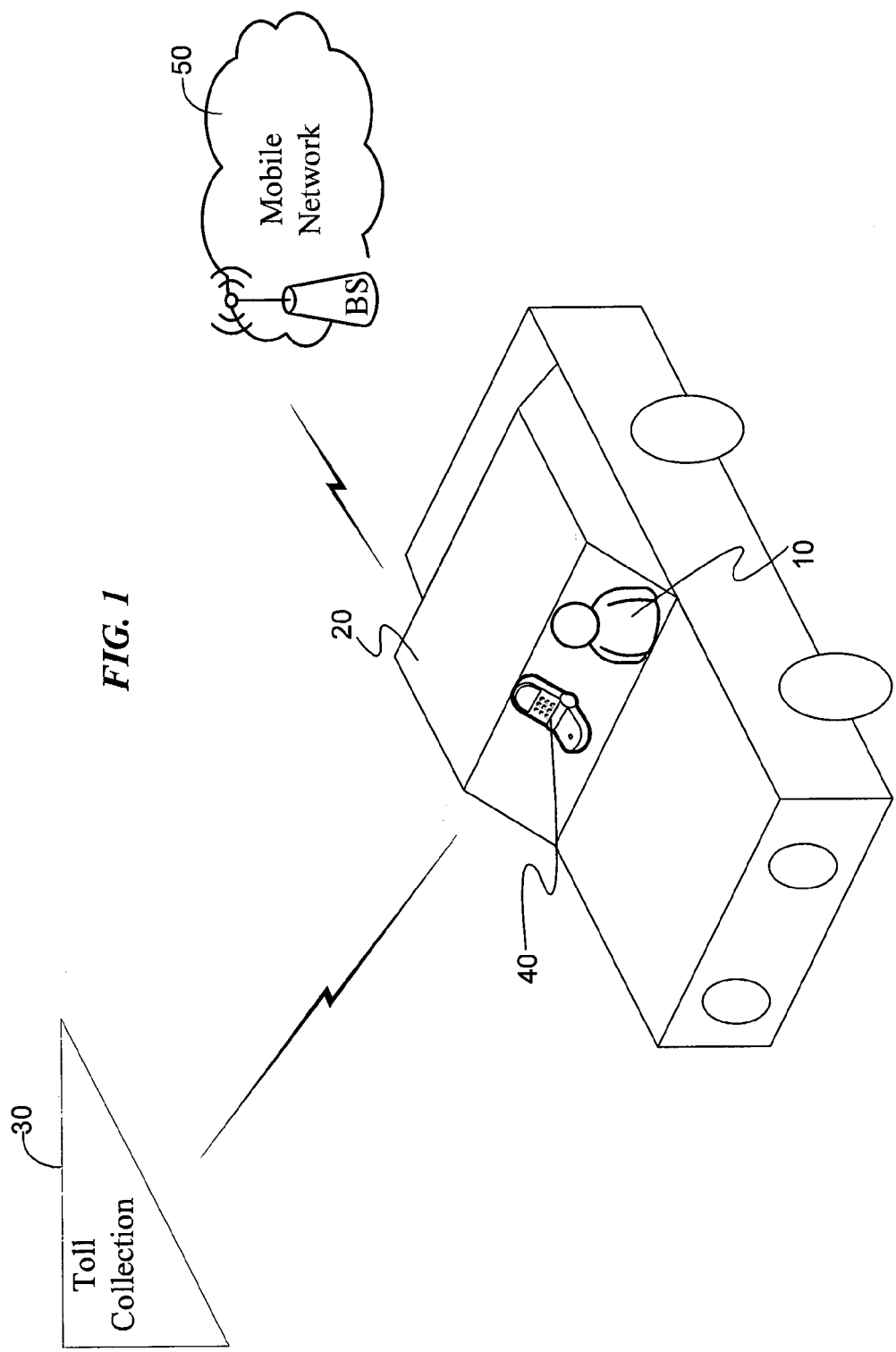
FIG. 1 illustrates a simple example of toll collection system.

Reference now is made in detail to the examples illustrated in the accompanying drawings and discussed below. FIG. 1 illustrates automatic toll collection using a mobile station. A user 10 is operating a vehicle 20 when the vehicle approaches an automatic toll collection interrogator 30. In the present example, the user's 10 mobile station 40 also will act as the automatic toll collector transponder to complete the automatic toll transaction.

The automatic system for paying tolls from moving vehicles typically operates in the following manner. Each vehicle 20 using the system uses clearly marked toll lanes that are equipped with the automatic toll collection interrogator 30, which can be a microwave transponder-computer (not illustrated). The user 10 now has a mobile station 40 with a transponder 100 on board which carries in its storage device 304 a pre-paid balance. As the vehicle 20 approaches the toll facility, it is interrogated by an automatic toll collection interrogator 30 located at the toll booth (not illustrated). This interrogation releases information required to process the toll transaction. This information is typically stored in the storage device 304 within the transponder 100. The information typically stored is an identification code, payment agent's code, vehicle class and, if required, the vehicle's entry location to the facility. A computer at the toll booth calculates the toll from the received information and transmits the amount to the transponder 100. This toll is then subtracted from the stored pre- paid balance. If the balance is not negative, the vehicle 20 is passed through.

The pre-paid balance is paid to a specified agent or authority whose identity is established via a permanently inserted number into the storage device 304. Only this agent would have the ability to increase the stored, pre-paid balance for that transponder 100 which can include a crypto entry code derived from the transponder's ID number and a microwave data injection means. The cash collection agency is then billed by each toll facility that the vehicle might subsequently use. A complete double entry computerized record system can be established from the available data.

Although the mobile station 40 may be a smart-phone or other potable device with wireless mobile communication capabilities, such as a personal digital assistant (PDA) or the like, for discussion purposes, the illustrations in FIGS. 2 and 3 show the mobile station 40 in the form of a handset. The handset example of the mobile device 40 functions as a normal digital wireless mobile station.

For purposes of such a discussion, FIG. 2 provides a block diagram illustration of an exemplary mobile station 40. FIG. 2 also illustrates an example where the transponder 100 can be removable from the mobile station housing 44. This example is designed to retrofit existing mobile stations 40 to be toll collection devices.

Although the mobile station 40 may be a smart-phone or may be incorporated into another device, such as a personal digital assistant (PDA) or the like, for discussion purposes, the illustration shows the mobile station 40 in the form of a handset. The handset example of the mobile station 40 functions as a normal digital wireless telephone station. For that function, the mobile station 40 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications through network 15 and possibly voice over packet (Internet Protocol) communications if supported by the mobile station 40 and the data services through the network 15.

For digital wireless communications, the mobile station 40 also includes at least one digital transceiver (XCVR) 108. Today, the mobile station 40 would be configured for digital wireless communications using one or more of the common network technology types. For example, the mobile station 40 may be a dual mode device capable of utilizing either or both of CDMA (IS-95, 1XRTT or EV-DO) technologies and 3GPP (LTE/GSM/UMTS) technologies. For that purpose, the transceiver (XCVR) 108 could be a multimode transceiver, or the mobile station 40 may include two or more transceivers each of which supports a subset of the various technologies or modes. The concepts discussed here encompass embodiments of the mobile station 40 utilizing any digital transceivers that conform to current or future developed digital wireless communication standards. The mobile station 40 may also be capable of analog operation via a legacy network technology, at least for voice telephone communications.

The transceiver 108 provides two-way wireless communication of information, such as vocoded speech samples and/or digital message information, in accordance with the technology of the network 50. The transceiver 108 also sends and receives a variety of signaling messages in support of the various voice and data services provided via the mobile station 40 and the communication network, in this case. Each transceiver 108 connects through RF send and receive amplifiers (not separately shown) to an antenna 110. In the example, the transceiver 108 is configured for RF communication in accord with a digital wireless protocol, such as the current CDMA and 3GPP protocols.

The mobile station 40 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a stylus and touch sensitive display screen, as in a PDA or smart phone. In addition to normal telephone and data communication related input/output (including message input and message display functions), the user interface elements also may be used for display of menus and other information to the user and user input of selections.

In the example, a microprocessor 120 serves as a programmable controller or processor for the mobile station 40, in that it controls all operations of the mobile station 40 in accord with programming that it executes, for all normal operations, and for operations involved in the authentication and identification procedure under consideration here. In the example, the mobile station 40 includes flash type program memory 114, for storage of various "software" or "firmware" program routines and mobile configuration settings, such as mobile telephone number (MTN or MDN), etc. The mobile station 40 may also include a non-volatile random access memory (RAM) 116 for a working data processing memory. The RAM, for example, may store an assigned IP address for the duration of a data registration on the network 50 as might be used for VoIP communications for a call scheduled and set-up by the service. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 40 includes a processor, and programming stored in the flash memory 114 configures the processor so that the mobile station is capable of performing various desired functions, including in this case the functions involved in the call scheduling service. For the procedure of FIG. 2, the programming may simply be the regular programming of the mobile station, for example, that used to enable regular SMS message input and transmission through the network 50 and that used for VoIP communication and related SIP type call set-up signaling.

A battery supply 122 is typically linked to the microprocessor 120 to power and operate the mobile station 40. FIG. 3 illustrates a cross-section of the mobile station 40 with the battery supply 122 removed. The battery supply 122 typically has battery contacts 200 to electronically connect to the mobile station contacts 202 so electrical power can pass through and power the microprocessor 120. In the present invention, the transponder 100 is designed extremely thin to fit between the housing 102 and the battery supply 122 and still allow a back cover 204 to enclose the battery supply 122. The transponder 100 also includes contacts 300 that allow it to be electrically connected to the battery supply 122 and still allow power to pass through to the mobile station contacts 202 to power the microprocessor 120.

In one example, the transponder 100 is communicatively isolated from the microprocessor 120. This is for privacy reasons. A mobile station 40 typically contains a host of private information about the user 10. A majority of users 10 typically do not want to share that information with the agency processing the toll collection. Additionally, since the transponder 100 is designed to receive and transmit data, there is a possibility that third parties can determine a way to interrogate the transponder to illicitly gain access to the user's private data.

FIG. 4 illustrates the transponder 100. As noted above, the contacts 300 allow electrical power from the battery supply 122 to pass through, but some can be used to power the transponder 100. A logic circuit (CPU) 302 is connected to the contacts to receive power. The logic circuit 302 is in electronic communication with the storage device 304. The storage device 304 can be ROM, EEPROM (flash) or RAM memory. In one example, the storage device 304 receives a trickle charge from the battery supply 122 to maintain the data stored within it. In other embodiments, power is not required to maintain the data.

A receiver-transmitter 306 is in electronic communication with the logic circuit 302 and the storage device 304, along with a transponder antenna 308. During a typical interrogation the automatic toll collection interrogator 30 emits a signal (in one form, microwave energy) which is received by the transponder antenna 308 and the receiver-transmitter 306. This signal prompts the logic circuit 302 to query the storage device 304 for the necessary information to process the toll request, and then passes that information to the receiver-transmitter 306 to be transmitted, over the transponder antenna 308, back to the automatic toll collection interrogator 30 to complete the transaction.

In a separate example, a power supply 310 can also be included in the transponder 100. The power supply 310 can be charged from the signal transmitted from the automatic toll collection interrogator 30 and be used as the power supply to power just the transponder 100 (i.e. logic circuit 302, storage device 304, receiver-transmitter 306, and transponder antenna 308). In this example, while the contacts 300 still allow electrical connection between the battery supply 122 and the microprocessor 120, the transponder 100 does not need to sap power off the battery supply 122. In yet a further example, the transponder 100 can use both an internal power supply 310 and draw power from the battery supply 122.

One feature of the above embodiments is that the transponder 100 will always be active. This can lead both to benefits and problems. In one instance, if the user 10 is a passenger in another's vehicle, the user can then offer to pay the tolls for the driver. The one downside is that if the user 10 does not want to pay for the driver's tolls, the transponder 100 must be removed from the mobile station 40 to be disabled. This is further compounded if the user 10 is a passenger on public transportation, e.g. a bus. Again, the user 10 may end up paying a toll as the bus passes through the automatic toll collection interrogator 30. However, the bus company can offer credits or other rebates to offset the toll collection.

One way to avoid the unwanted payment of tolls is to design an application for the microprocessor 120. The application can allow the microprocessor 120 to at least partially communicate with the transponder 100 and allow the user 10 to activate or deactivate the transponder 100 through the mobile station's interface without physically removing the transponder from the mobile station 40.

As noted, all of the above embodiments are designed to be retrofitted into existing mobile stations 40. Given the small tolerances between the battery supply 122 and the back cover 204, and the differing configurations of battery size, shape, and contact placement, numerous retrofit transponders are required, likely one for at least each major brand of mobile station 40. Further, the transponder 100 needs to be made as thin as possible to fit within the existing tolerances. Also, the transponder 100 needs to draw as little power as possible, so as to not interfere with the operations of the mobile station, during both rest and interrogation periods.

In addition, there are numerous automatic toll collection formats (e.g. E-ZPASS, ETR, Fast Lane, I-Pass, etc.) who's data needs to be stored on the transponder 100 to process the transactions. In an example, user 10 can go to the local electronic toll administration agency and request a transponder 100 for their particular mobile station and formatted for that particular agency. Alternately, the mobile station companies can supply the transponders 100.

Figure 5:
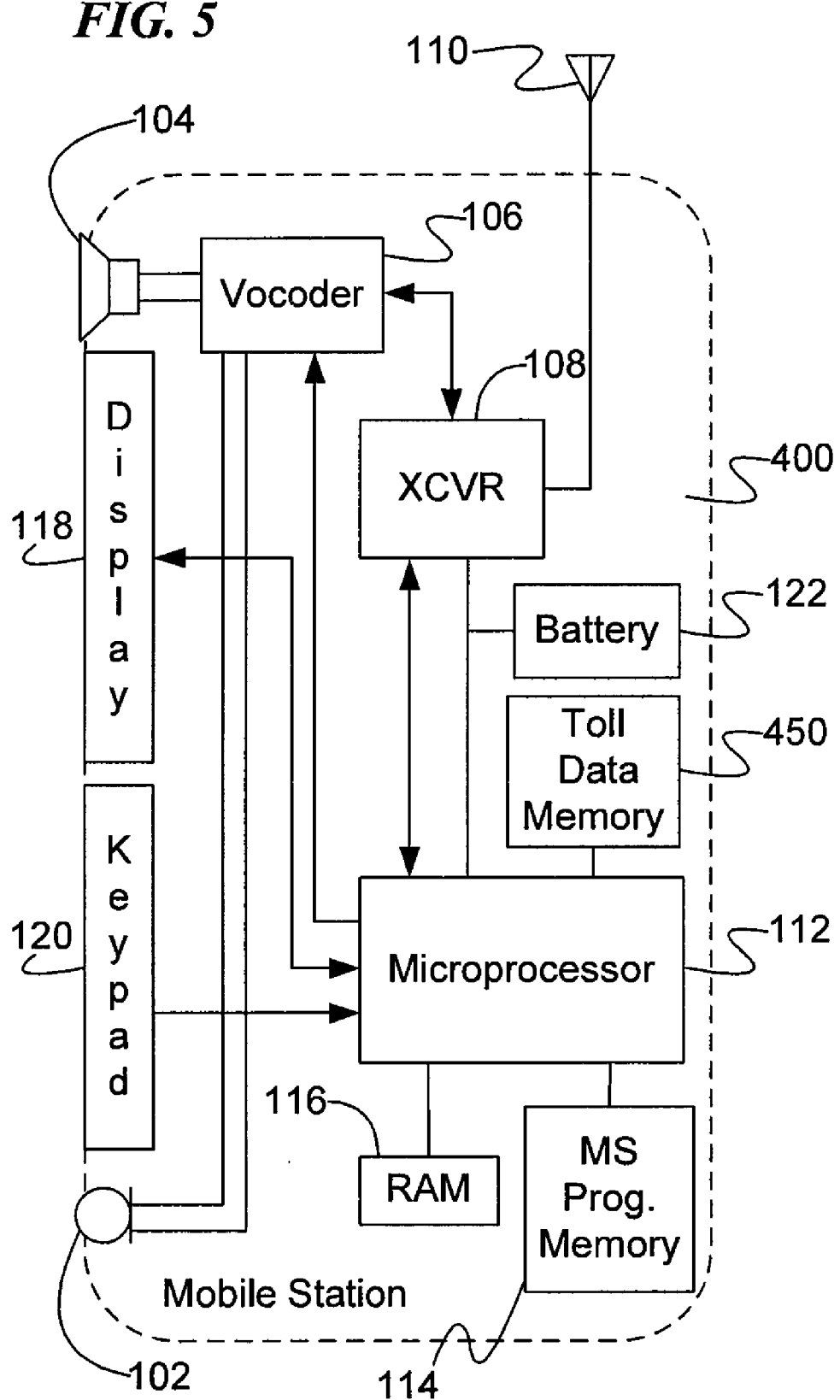
FIG. 5 is a diagram of an integrated cellular telephone/electronic toll collection transponder.

Another example integrates the transponder 100 features into the mobile station as a native feature and shares in the existing mobile station hardware. FIG. 5 shows a schematic of mobile station 400. The integrated mobile station 400 includes many of the same elements as in mobile station 40, described above and illustrated in FIG. 2. In addition, mobile device antenna 110 can be capable of sending and receiving mobile station signals, automatic toll collection interrogation signals, and any other signals for the features included with the mobile station (i.e. Bluetooth, WiFi, etc.) While described as a single antenna, ones of ordinary skill in the art are aware that multiple antennae can be utilized to the same ends.

In this example, the microprocessor 120 can be programmed to performed all the functions of the logic circuit 302 as well as necessary functions to operate the mobile station 400. Likewise, memory 114, 116 can store all of the information typically stored on storage device 304, as well as all of the information needed for and stored upon the mobile station 400, as is typically stored in memory 114, 116.

Alternately, there can be mobile device memory 114, 116 and an electronic toll memory 450. The toll data memory 450 may be an integral memory of the station or a memory that is purchased/inserted as an add-on at the time or after the user obtains the station. Some mobile stations today include SIM (Subscriber Identity Module). SIM cards currently act to uniquely identify a mobile station 400, a user can use an ET-SIM to store all of the of the unique identifiers for an automatic electronic toll subscriber. This is useful, since SIM cards currently come in standard sizes and mobile stations are already designed to accept and read such cards. Thus, a user 10, when subscribing to the automatic electronic toll system, would only need to receive an ET-SIM card and plug it into his or her phone to activate the system. Also, like SIM cards, which can be transferred from mobile station to mobile station as the user upgrades and changes models, so too can the ET-SIM be transferred between mobile stations of the user 10. The use of an ET-SIM can address any privacy issues, as discussed above, and still allow the microprocessor 120 to activate and deactivate the transponder features.

Another feature of integrating the transponder 100 features into the mobile station 400 is that the transponder ID can be the Mobile Equipment Identifier (MEID) assigned to the mobile station. Each mobile station 400 has a unique identifier (typically a 56-bit identification number) that is globally unique. The MEID is typically embedded in the microprocessor 120, and cannot be easily altered. This can reduce fraud and "cloning" of the transponder's identification. Further, another verification step can be performed by comparing other identifiers present in a mobile station's memory or ET-SIM card to MEID to verify that the any of the identifiers have not been altered.

Use of a mobile station as an electronic toll transponder opens many possibilities. First, it can lower the overhead cost to the electronic toll administration agency since standard SIM cards or even the retrofitted transponder will be less costly to produce. SIM cards are already in mass production and ubiquitous so there are no added costs for using proprietary hardware. Second, the need for distribution centers can be reduced if the agency authorizes the mobile station distributors to distribute the retrofit transponders or ET-SIMs. The agency can then "flash" the ET-SIM over an Internet connection if the mobile station is connected to a computer, or it can be "flashed" over the cellular network, like current SIMs are for the mobile stations.

Additional benefits can be gleaned since a user 10 can now access their electronic toll account from their mobile station. This can allow them to check their balance and maybe even pay outstanding charges, so the account is never under the minimum balance. Further benefits to the electronic toll agency in that they can pass along billing responsibility to the mobile station companies, so there is a unified statement of both phone and toll charges, allowing the mobile station companies to collect the tolls. This can also lead to different opportunities to recover delinquent tolls, by shutting off mobile station service to the non- paying user.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A combination mobile station and electronic toll collection device, comprising:
 a transponder configured to communicate with an automatic toll collection station to provide an identification of the transponder for toll collection purposes;
 a mobile station antenna;
 a mobile transceiver electrically linked to the antenna, the mobile transceiver configured to transmit and receive mobile communication signals via the antenna;
 a microprocessor electronically linked to the mobile transceiver to control the transmission and reception of the mobile communication signals;
 a battery electrically linked to the transponder and at least provides power to the mobile transceiver and to the microprocessor, and
 a mobile station housing containing the transponder, the mobile transceiver, microprocessor, and battery.

2. The combination mobile station and electronic toll collection device of claim 1, wherein the transponder comprises:
 a logic circuit;
 a storage device, storing the identification of the transponder for toll collection purposes, and is in electronic communication with the logic circuit;
 a receiver-transmitter, transmitting and receiving data for toll collection purposes, and is in electronic communication with the logic circuit and the storage device; and
 a transponder antenna in electronic communication with the receiver-transmitter for wireless communication between the receiver-transmitter and the automatic toll collection station.

3. The combination mobile station and electronic toll collection device of claim 2, wherein the battery provides power to the logic circuit, the storage device and the receiver-transmitter.

4. The combination mobile station and electronic toll collection device of claim 2, wherein the transponder further comprises a power supply, separate from the battery, providing power to the logic circuit, storage device and the receiver-transmitter.

5. The combination mobile station and electronic toll collection device of claim 1, wherein the mobile station antenna is housed at least partially inside the mobile station housing.

6. The combination mobile station and electronic toll collection device of claim 1, wherein the transponder is removable from the mobile station housing.

7. The combination mobile station and electronic toll collection device of claim 1, wherein the transponder is communicatively isolated from the microprocessor.

8. An integrated mobile station and electronic toll collection device, comprising:
 an antenna emitting mobile communication signals and automatic toll collection signals;
 at least one wireless transceiver electrically linked to the antenna, the transceiver configured to transmit and receive the mobile communication signals via the antenna, and configured to communicate with an automatic toll collection station via automatic toll collection signals emitted by the antenna;
 a microprocessor electronically linked to the mobile transceiver to control the transmission and reception of the mobile communication signals and configured to respond to electronic toll interrogations via automatic toll collection signals; and
 a battery electrically linked to supply power to the at least one wireless transceiver and the microprocessor; and a mobile station housing containing the wireless transceiver microprocessor and battery.

9. The integrated mobile station and electronic toll collection device of claim 8, further comprising an electronic toll memory storing information necessary to respond to electronic toll interrogations and electronically linked to the microprocessor.

10. The integrated mobile station and electronic toll collection device of claim 9, wherein the electronic toll memory is a SIM card.

* * * * *